INVENTOR.
EDWARD W. SCHATZMAN AND
VINCENT C. WEBSTER,
BY

ATTORNEYS.

United States Patent Office 3,263,300
Patented August 2, 1966

3,263,300
AUTOMATIC TOOL CHANGE ARRANGEMENT
Edward W. Schatzman and Vincent C. Webster, both of South Fort Mitchell, Ky., assignors to The Motch & Merryweather Machinery Co., Cleveland, Ohio, a corporation of Ohio
Filed Dec. 30, 1963, Ser. No. 334,427
18 Claims. (Cl. 29—26)

This invention relates to a universal machine tool adapted to perform numerous working operations, and more particularly to an automatic tool changer for such a machine.

Large industrial drilling machines are often designed so that they can perform a number of different machining operations, such as, for example, drilling, boring, reaming, tapping and light milling. It will, of course, be understood that each of the above enumerated operations requires its own tool, and hence it will be apparent that if a single drilling machine is to successively perform two different operations, a change of tools will be required which will result in a loss of machine cutting time. According to the prior art, this problem has been solved in part by providing a drilling machine with a multiple spindle turret. Each spindle can then be preloaded with a desired tool, and perhaps as many as eight different operations may be performed by the same drilling machine, simply by rotating the turret to place the proper spindle in the operating position. In this manner, the loss of time due to tool changing between successive operations is reduced to a minimum.

Improved modern control systems have made it possible, and hence in many ways desirable, to have a single drilling machine perform more than eight different operations upon a work piece. The prior art has attempted to provide such a machine by utilizing a large capacity tool magazine or matrix, and then providing complicated moving arms and fingers which will select a desired tool from the magazine and insert it in a spindle. While increasing the versatility of the machine, these arrangements are very slow and increase the cutting time lost between tool changes.

Furthermore, such arrangements are relatively expensive to produce, and require additional highly complex electrical and mechanical control systems.

In general terms, it is a primary object of this invention to provide a tool change arrangement for drilling machines which has the capacity to handle a large number of tools, and which will accomplish the tool change operation with a minimum loss of productive cutting time.

More specifically, it is an object of this invention to provide a tool changer which utilizes in large part the normal, necessary drilling movements to accomplish the tool change.

Ancillary to the above objects, it is a further object of the invention to provide an automatic tool changer which requires a minimum of auxiliary moving components.

Another object of the invention is the provision of an automatic tool changer for a drilling machine which has at least two spindles, and is so constructed that one of the spindles will be in the tool change position, while the other spindle is in the operating position.

Still another object of the invention is to provide a tool magazine or matrix which will accommodate a large number of varied tools, and which will present the proper tool to the drilling machine spindle in a minimum of time, so that the production time loss due to the tool change may be further reduced.

The foregoing objects, along with others which will become apparent to the skilled worker in the art as this specification proceeds, are accomplished by that certain construction and arrangement of parts, of which an exemplary embodiment will now be described. Reference will be made from time to time to the accompanying drawings in which:

FIGURES 2a–b through 5a–b are schematic views showing the various operating movements utilized to accomplish the tool change operation;

Figure 1:
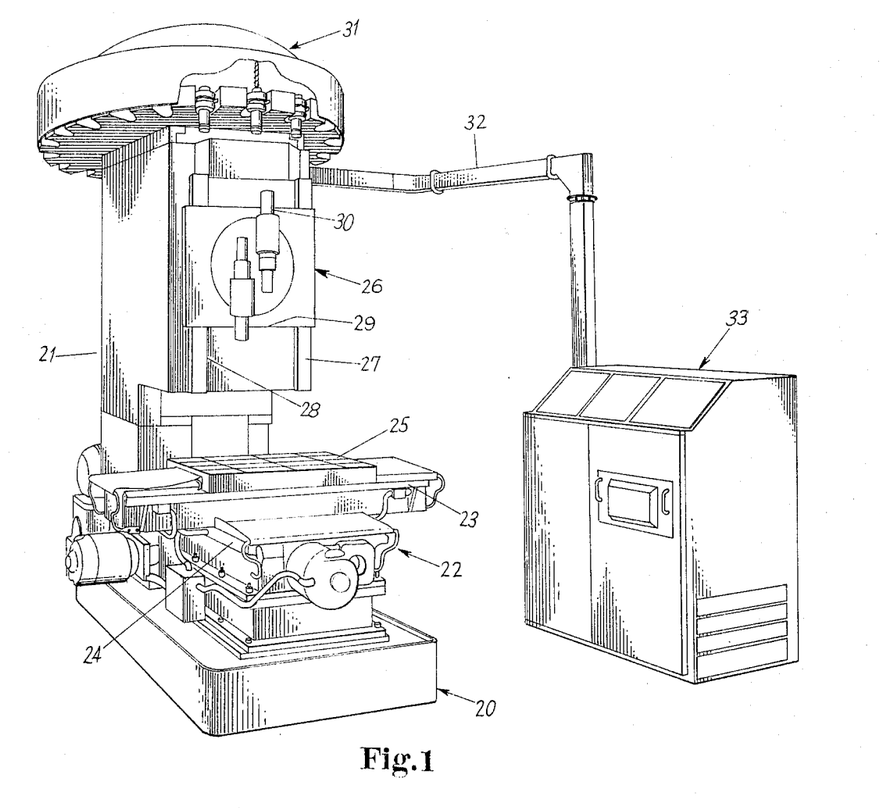
FIGURE 1 is a perspective view of a drilling machine including the tool changer of this invention.
Figures 2A, 3A:
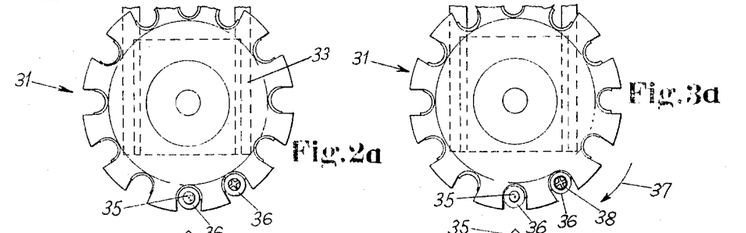
Figure 2B:
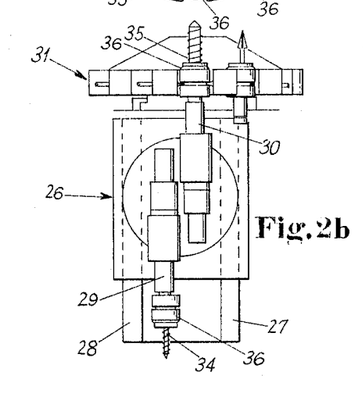
Figures 3B, 5A:
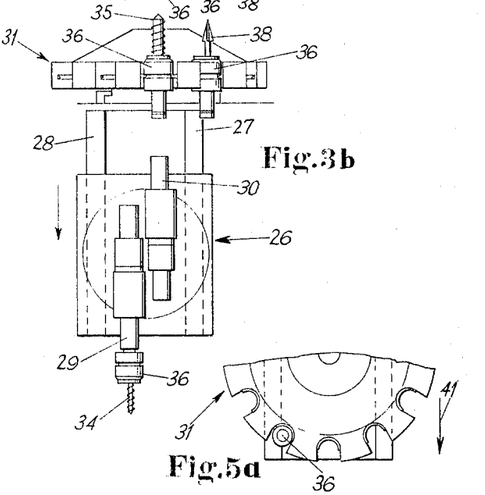

The overall relationship of the various components of a drilling machine embodying the instant invention may conveniently be described with reference to FIGURE 1.

The drilling machine generally includes a base 20 on which is mounted the upstanding column 21 and the work table mechanism 22. The work table mechanism includes the sets of ways 23 and 24 arranged perpendicular to each other, and which, in conjunction with a suitable power source and control mechanism, serve to locate the work table 25 with respect to the working spindle. The construction and mechanism of the work table assembly is entirely conventional, and does not as such form a part of this invention.

The turret assembly 26 is mounted on the column 21 for vertical reciprocation in opposed working and return strokes along the ways 27 and 28, and for rotation about its central horizontal axis. The turret assembly 26 mounts the working spindles 29 and 30, which, when fitted with conventional chucks and cutting tools, perform the various machining operations in a manner described in more detail hereinafter. It will of course, be understood that the drive and gear arrangement for turning the spindles, as well as the arrangement for rotating the turret assembly 26 and reciprocating it along the ways 27 and 28, are housed within the top of the column 21, and will be described in greater detail hereinafter.

At the top of the column 21 is the matrix or tool magazine 31. The magazine 31 contains a plurality of tool compartments, each of which may contain a different cutting tool. As will be explained in more detail hereinafter, the magazine 31 is mounted for rotational movement about its central axis and for sliding movement along a path perpendicular to its axis, from a retracted position to a tool change position, these various motions operating in timed relation to the movement of the turret assembly 26 so as to accomplish the tool change operation.

The electrical circuitry for controlling all of the various motions of the drilling machine and of the tool changer are led through the conduit 32 to the external control center 33. As is well known in the art, the control center 33 is generally arranged to permit both manual control of the machine, as well as full taped programming.

Coming now to FIGS. 2a–b through 5a–b, the various operating movements utilized to accomplish the tool change operation will be schematically described. In each of the four groups of figures, the a diagram represents the tool magazine 31 as seen in top plan view, while the b diagram represents the turret assembly 26 and magazine 31 as seen in front elevation. In the position shown in FIGURES 2a and 2b, the magazine 31 has been moved along its ways to its forwardmost or tool change position, and the turret assembly 26 has completed its return stroke and is at rest at its uppermost or tool change position. The spindle 29 carrying the tool 34, is in the 6 o'clock or operating position, while the spindle 30 carrying the tool 35 is in the 12 o'clock or tool change position. In this position, it will be seen that the tool holder or collar 36 (note that each tool is provided with a collar 36) of the tool 35, is engaged within a tool compartment in the tool magazine 31. Starting from this position, the turret assembly 26 begins its working stroke downwardly toward a work piece (not shown). As this occurs, the tool 35 will be retained by the magazine 31 as shown in FIG. 3b.

While the spindle 29 and tool 34 are performing the desired working operation, the magazine 31 is rotated about its central axis as indicated by the arrow 37, to bring the next tool, such as, for example, tool 38, to the tool change station. This will bring the magazine 31 to the position shown in full lines in FIG. 4a. By performing the tool search during the working stroke, tool change time is reduced to a minimum.

When the operation to be performed by tool 34 is complete, the turret assembly 26 begins its return stroke along the ways 27 and 28. When the turret assembly reaches its uppermost position, it will be apparent that the shank of the new tool 38 has now been brought into engagement with the chuck of the spindle 30. In one embodiment of the invention, the return stroke of the turret may be used to insure endwise location of the tool in the chuck. The chuck carried by the spindle 30 is then tightened to securely engage the tool in a manner to be described more fully hereinafter. The relationship of the various components at this time is shown in FIG. 4b.

Figure 4A:
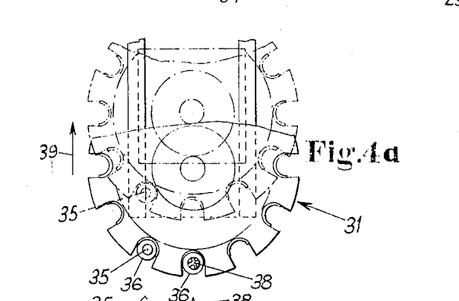
Figure 4B:
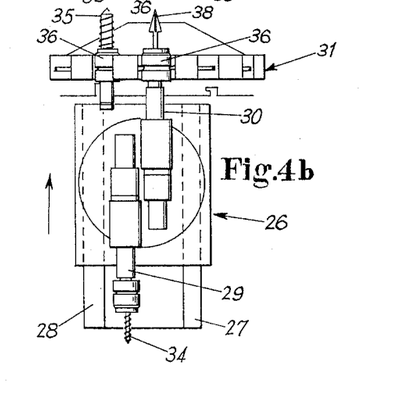
Figure 5B:
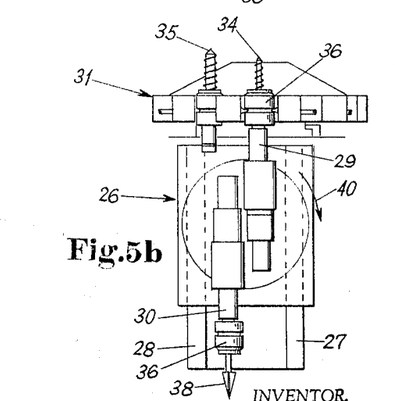
Figure 6:
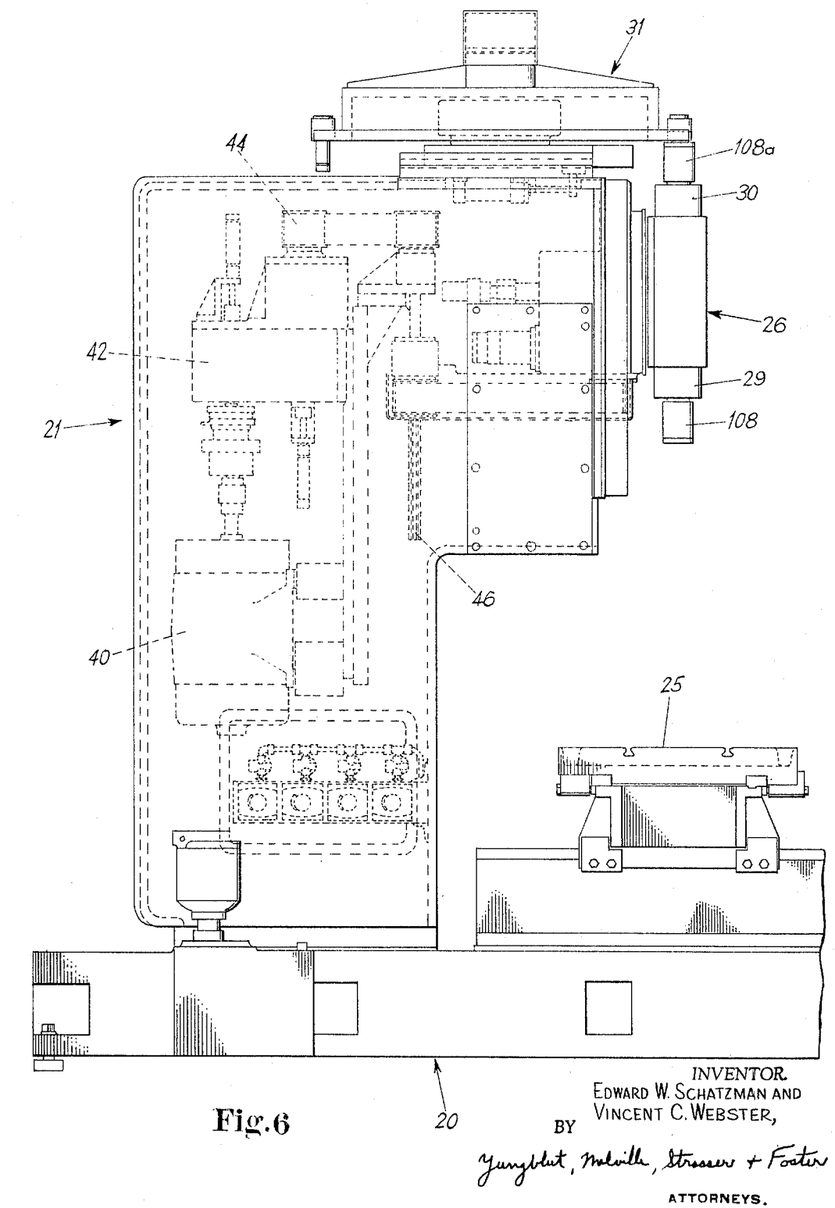
FIGURE 6 is a side elevational view of the drilling machine of FIGURE 1, showing in dotted lines certain of the driving components of the drilling machine.

Upon completion of the return stroke of the turret assembly 26, the magazine 31 is slid rearwardly along its ways to its retracted position as indicated by the arrow 39, the retracted position being indicated in dotted lines in FIG. 4a.

Once the magazine 31 has reached its retracted position, the turret assembly 26 is rotated about its central axis as indicated by the arrow 40 (FIGURE 5b), to bring the spindle 30 and tool 38 to the operating position, and to simultaneously bring the spindle 29 and tool 34 to the tool change position. At this time, the various elements will be in the position indicated in FIG. 5b.

The tool magazine 31 is then slid forward as indicated by the arrow 41 to the tool change position, in which the frontmost tool compartment engages the collar 36 of the tool 34; the above described cycle may then be repeated.

It may be pointed out incidentally at this time that the above cycle can be used to load the tool magazine. That is, a tool can be placed in the spindle in the operating position during its working stroke. When the turret indexes, this tool can be placed in the magazine, and another tool placed in the other spindle. This enables a workman to load the magazine from a position on the floor, without ladders, scaffolding, or other such devices.

From the foregoing description, it will be apparent that the tool change operation is accomplished by only four movements. These are (1) the rotation of the magazine 31 to bring an empty tool pocket to the frontmost position for receiving a tool from the spindle in the tool change position, or to bring a proper tool to the same station, (2) the sliding motion of the magazine 31 between its retracted and tool change positions, serving alternately engage and disengage a tool held in the spindle being unloaded or reloaded, (3) the rotation of the turret assembly 26 to alternately place its spindles in the operating and tool change position, and (4) finally, the normal opposed working and return strokes of the turret utilized in performing the cutting operation. In other words, insertion and removal of a desired tool from the spindle in its tool change position is accomplished simply by the vertical reciprocation of the turret 26. Furthermore, the various movements of the magazine 31 are accomplished while one spindle with its associated tool is performing its cutting operation. This construction results in a new and useful tool changer which will find wide application in the machine tool industry.

While the novel features of the invention are stated generally in the claims appended to this application, it is believed that the following detailed description of a specific embodiment of the invention will further a complete understanding of the invention and its ramifications.

*Turret assembly*

The turret assembly heretofore indicated generally at 26, is reciprocated vertically along the ways 27 and 28 in a conventional manner, as by an hydraulic cylinder (not shown) controlled through suitable valves to give both a rapid traverse down toward the workpiece and away from the workpiece, and to provide for a desired number of rates of feed.

Figure 12:
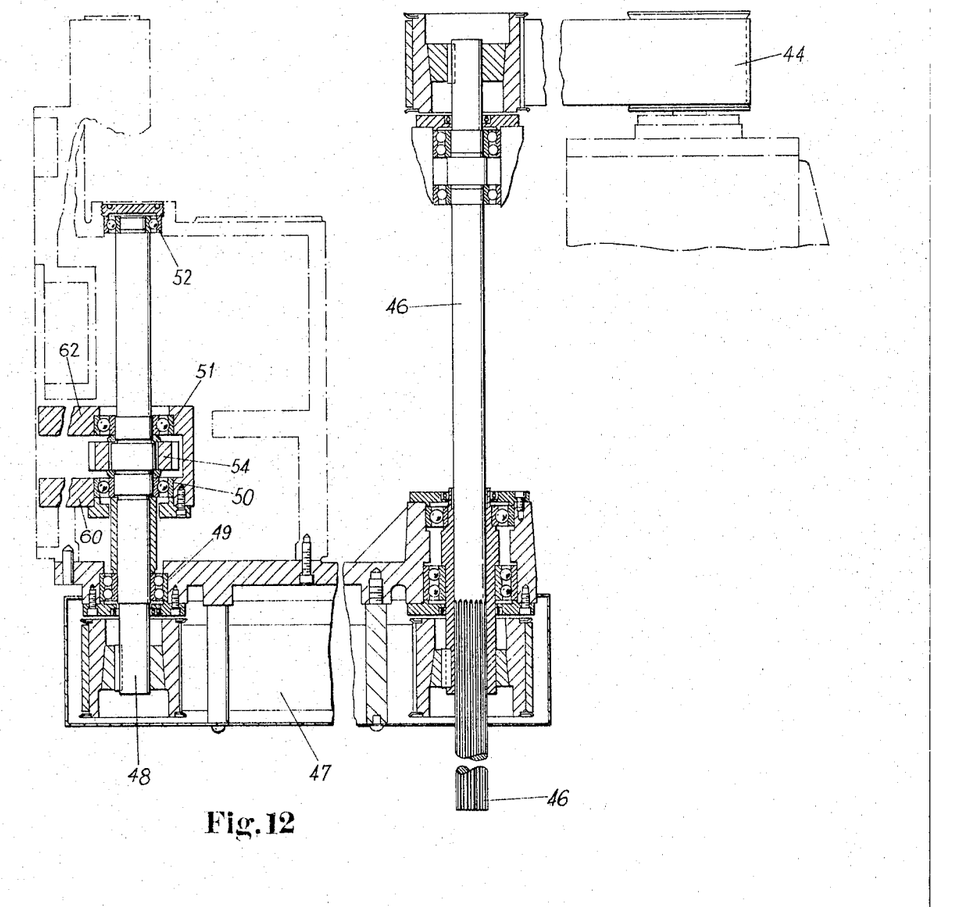
FIGURE 12 is a cross-sectional view through the top column of the drilling machine, showing the spindle driving mechanism.

Similarly, the spindles 29 and 30 carried by the turret 26 may be driven in a conventional manner, power being derived from the electric motor 40, and transmitted through the gear box 42 to the driven pulley 44, which in turn drives the splined shaft 46 (see FIG. 12), which again in turn drives the shaft 48 through the belt 47, thereby turning a gear train described in more detail hereinafter to rotate the various spindles at the desired speed.

Figure 7:
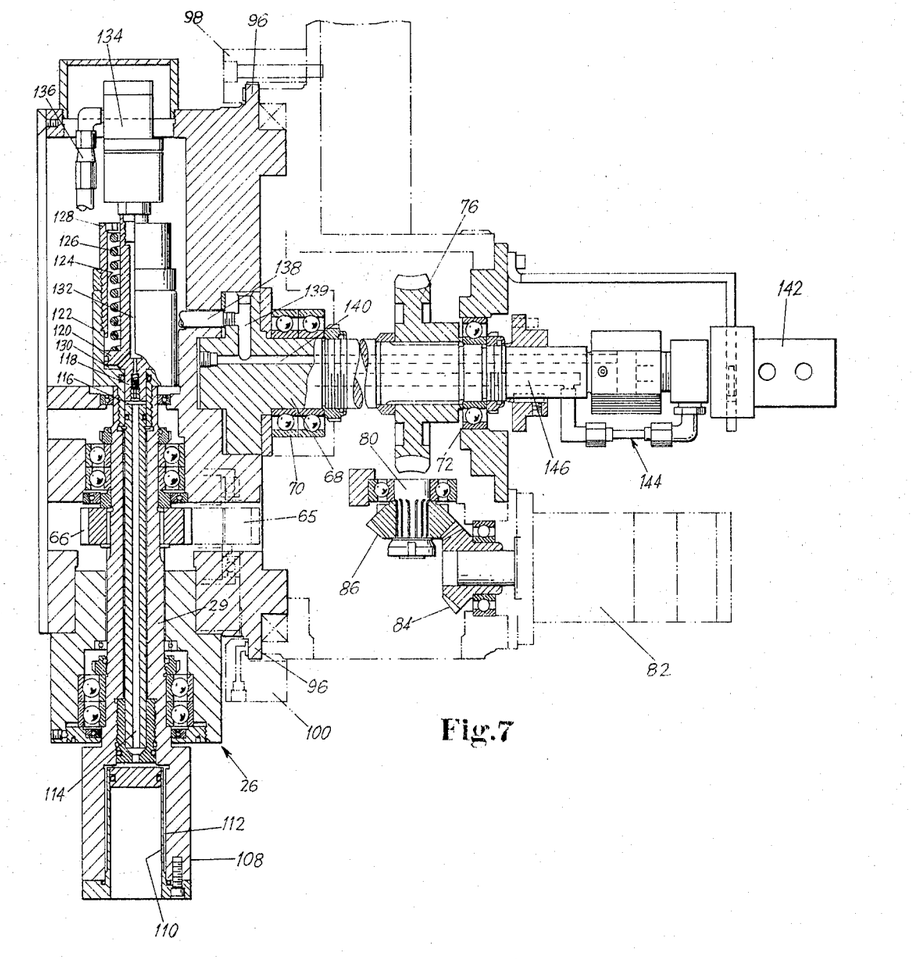
FIGURE 7 is a cross-sectional view through the turret, showing the mechanism for rotating the turret and an exemplary chuck arrangement.
Figure 8:
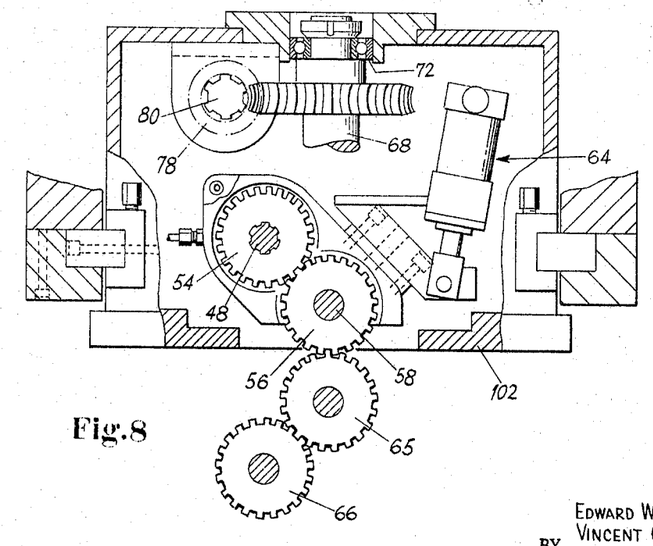
FIGURE 8 is a cross-sectional view through the turret gear box showing the spindle drive arrangement.

As shown in horizontal section in FIG. 8 (see also FIGS. 7 and 12), the shaft 48 is suitably journaled in bearings as at 49, 50, 51 and 52. The shaft 48 carries the driving gear 54 which is in meshing engagement with the idler gear 56. The gear 56 is mounted on a shaft 58, which is mounted between the mounting brackets 60 and 62. As is clearly apparent in FIG. 12, the brackets 60 and 62 are joined together for rotation (carrying the shaft 58 and idler gear 56) in arcuate movement about an axis concentric with the shaft 48. Movement of the mounting brackets 60 and 62, in their arcuate path, is controlled by means of the hydraulic cylinder generally indicated at 64. It again will be understood that the cylinder 64 will be connected through suitable hydraulic valves and appropriate controls whereby the movement of the idler gear 56 may be controlled, as outlined below.

Mounted within the turret 26 itself is the second idler gear 65, which is in meshing engagement with the gear 66, which is splined or otherwise suitably secured to the spindle 29. Corresponding gears 65a (not shown) and 66a are associated with the spindle 30, and are brought into operative relationship with the driving gear 54 and first idler gear 56 by rotation of the turret 26, and upon actuation of the hydraulic cylinder 64.

Figures 10, 11:
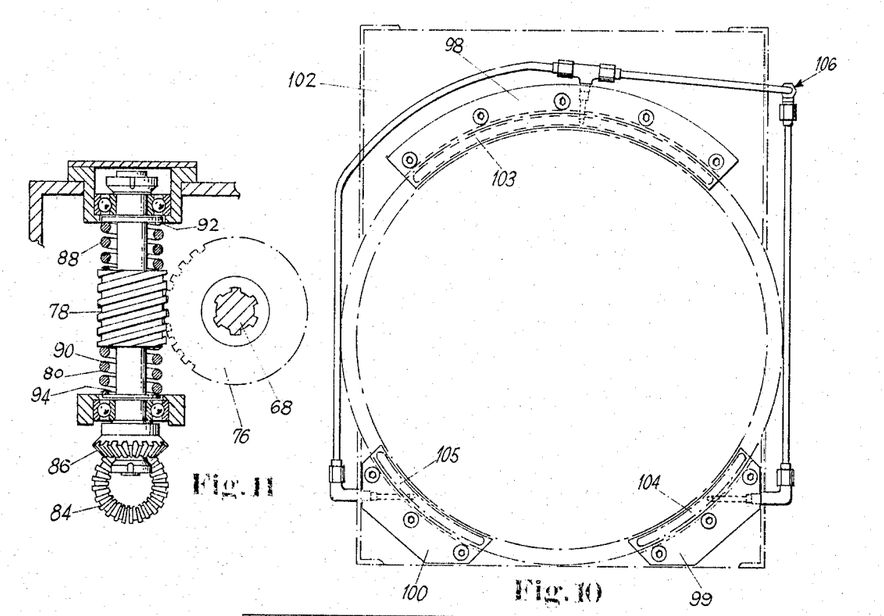
FIGURE 10 is a front elevational view showing an air clamp arrangement for locking the turret in position.
FIGURE 11 is a cross-sectional view on a greatly enlarged scale showing the mounting for the worm drive for rotating the turret about its axis.

Referring now to FIGURES 7, 8 and 11, mechanism for indexing the turret assembly 26 will now be described. The turret assembly 26 is provided with a rearwardly extending central shaft 68, journaled in bearings 70 and 72.

A worm wheel 76 is secured on the shaft 58 in any suitable manner. The worm wheel 76 is driven by the worm 78, which is secured to and floats upon the shaft 80. The shaft 80 is in turn driven by the hydraulic motor 82, through the miter gears 84 and 86.

As noted above, the worm 78 is adapted to float on the shaft 80. This is accomplished by keying the worm to the shaft, and mounting the stiff compression springs 88 and 90 between the ends of the worm 78 and the thrust washers 92 and 94 respectively. By virtue of this construction, it is possible to obtain a very accurate indexing of the turret assembly. That is, a shot bolt (not shown) is provided which will snap into a recess in the turret when the proper position has been reached, as is conventional in the art. The floating worm will permit a slight movement of the worm wheel 76, without a corresponding rotational movement of the worm 78, by moving the worm axially along shaft 80, such relative movement of course, being impossible without the floating arrangement described above.

As seen in FIGS. 7 and 10, the rearmost portion of the turret assembly 26 is provided with an outwardly extending peripheral flange 96. This flange is engaged by the air clamps 98, 99 and 100, which are secured in a suitable manner to the front plate 102 of the turret index mechanism housing. These air clamps are provided with the air pockets 103, 104 and 105, respectively, which through the piping indicated generally at 106, may be supplied with air under pressure. By means of these air clamps, once the turret has been rotated to its proper position and compressed air is introduced through the pipes 106, the turret is securely locked against the non-rotatable portion of the machine.

As conventional in the art, both the spindle 29 and the spindle 30 will be provided with an enlarged head 108 and 108a respectively. It will of course, be understood that the spindles 29 and 30, and the chucks associated respectively therewith, are exactly identical, and hence the operation of only the spindle 29 and its head 108 will be described. It may be noted at this time that in the embodiment shown, the spindles 29 and 30 are offset to opposite sides of the center line of the turret assembly 26. This construction has proved very desirable in minimizing the height dimension of the turret assembly, but is not a necessary limitation on this invention.

The head 108 includes the chuck 110 which is adapted to receive the shank of a tool or tool holder. Surrounding the chuck 110 is an annular space 112, which, in combination with the passage 114 through the center of the spindle, forms an oil reservoir. The upper end of the passage 114 communicates with a cylinder 116 having a piston 118. As is clearly shown in FIG. 7, the piston 118 is in effect an extension on the larger piston 120 which is fitted in the cylinder 122. Located within the space 124 of the cylinder 122 is the very heavy compression spring 126, which is compressed between the top surface of the piston 120 and the cap 128 of the cylinder. But by way of example, the spring 126 will preferably be of such a size to exert a pressure on the order of 1600 pounds per square inch on the piston 120. As is well known in the art, this will tend to drive the piston 120 and its extension, the piston 118, downwardly. The decreased diameter of the piston 118 serves to greatly multiply the pressure on the oil or liquid in the passages 114 and 112, which in turn acts upon the chuck 110 to securely engage the shank of the tool holder.

To release the above chuck, oil or other fluid under pressure is introduced into the space 130 beneath the piston 120, thereby forcing it upwardly against the spring 126. Upward movement of the piston 120, which of course carries its extension, the piston 118 upwardly, thereby reducing the pressure on the oil in the passage 114 and annular space 112, and permits the shank of the tool holder to be withdrawn from the chuck in the manner contemplated in the description of the general operation of the machine.

Figure 9:
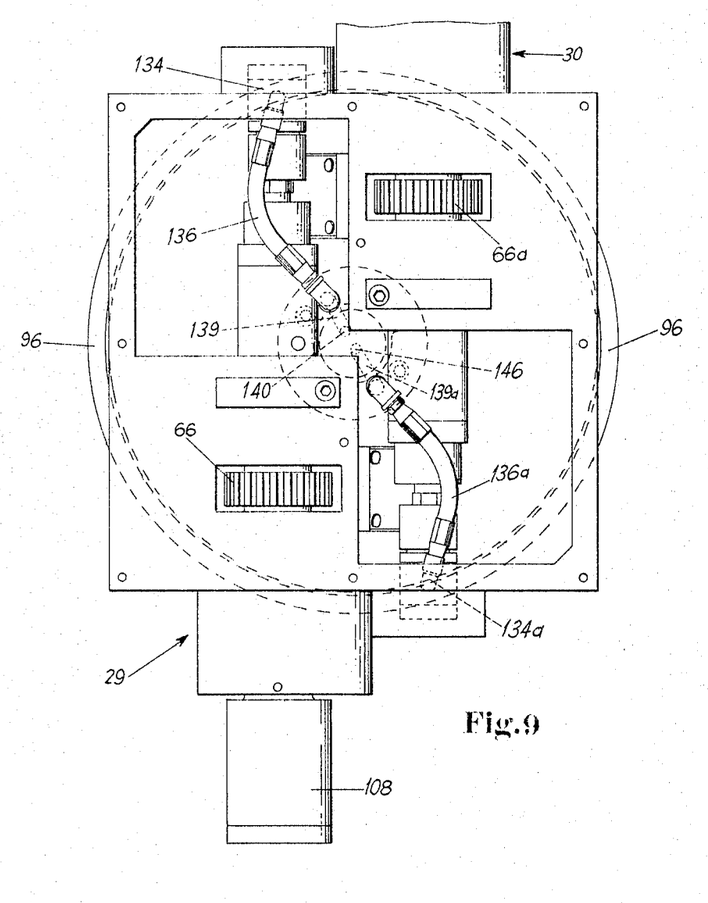
FIGURE 9 is a front elevational view of the turret.

As shown in FIGS. 7 and 9, the supply of oil to the space 130 is delivered through the passage 132 formed through the center of the piston 120, the hydraulic rotating union 134, the flexible tube 136, the passages 138, 139 and 140 formed in the central shaft 68, and the double passage hydraulic rotating union 142. It will of course be understood that the union 142, and the passages 144 and 146 serve to supply oil or other fluid to the chuck 108a associated with the spindle 30.

Tool magazine assembly

Turning now to FIGS. 13 through 17, the tool magazine indicated generally at 31, and its associated mechanism will now be described.

Figure 14:
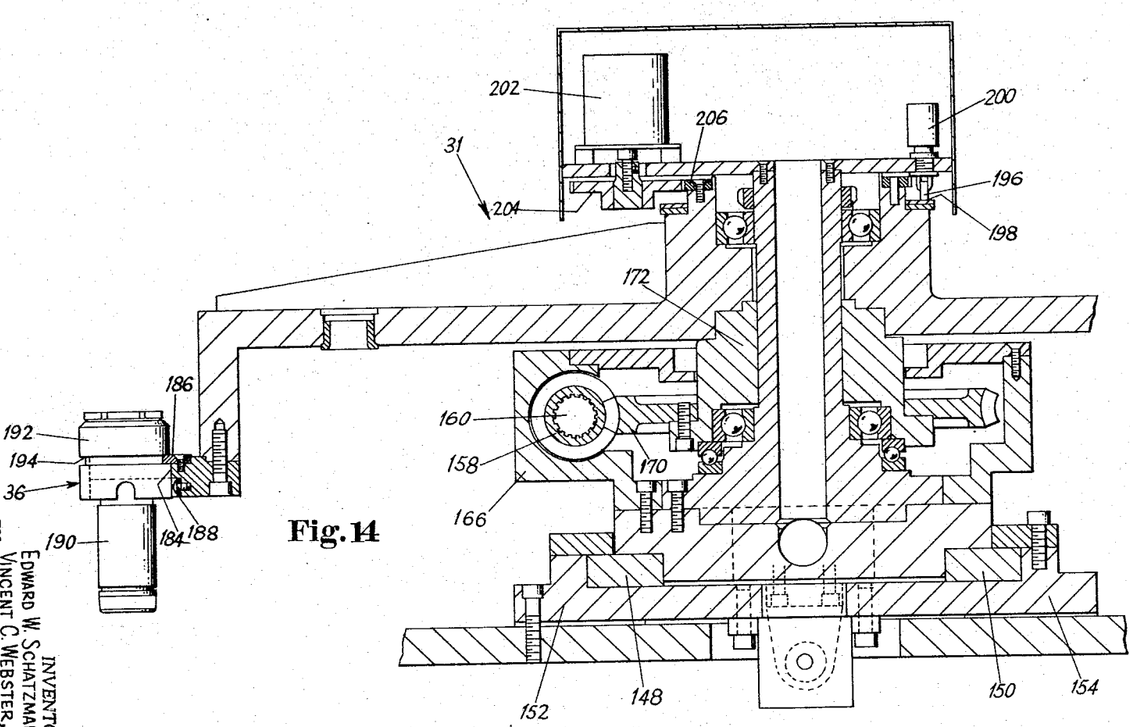
FIGURE 14 is a cross-sectional view on a greatly enlarged scale along the line 14—14 of FIG. 13.

As best seen in FIG. 14, the under structure of the magazine 31 is provided with the outwardly extending flanges 148 and 150, which coact with the ways 152 and 154 to accommodate sliding movement of the magazine 31 from a retracted position to a tool change position. This sliding movement of the magazine 31 may be controlled by any desired mechanical or hydraulic arrangement. In the exemplary embodiment illustrated, this sliding movement is caused by the hydraulic cylinder 156, which will be connected through suitable control valves to a supply of hydraulic fluid under pressure.

Figure 13:
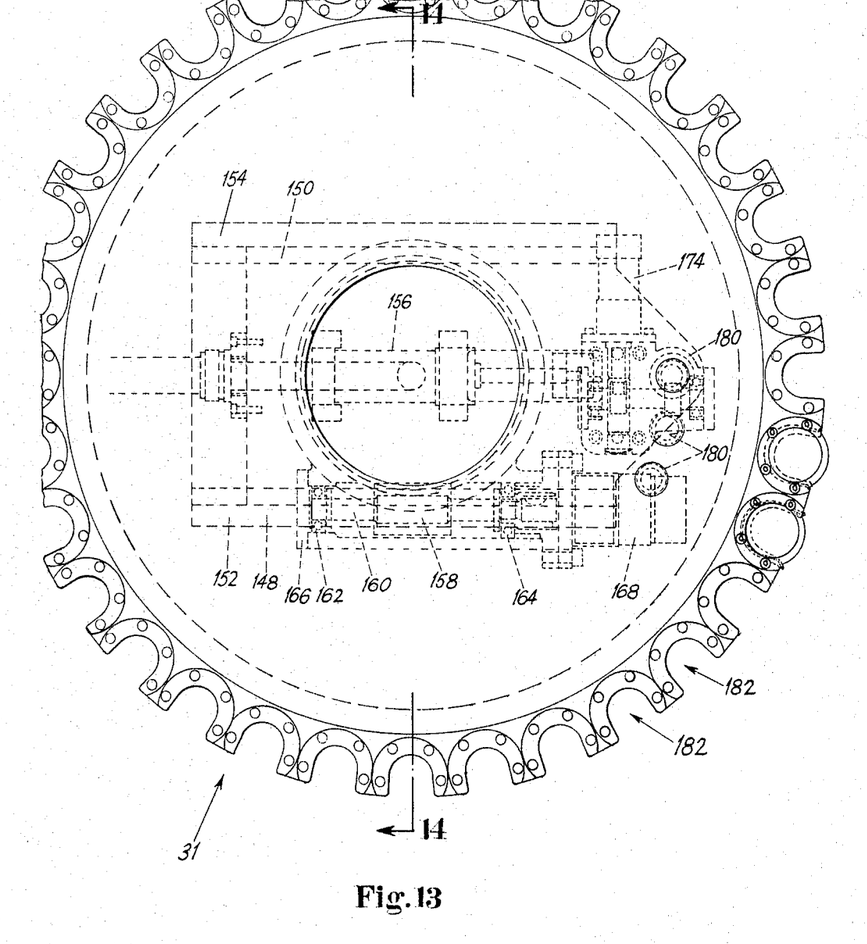
FIGURE 13 is a top view of the tool magazine, showing the means for rotating the magazine in dotted lines.

Likewise, it will be recalled that the tool change operation requires that the magazine 31 be rotatable about its central axis. In the embodiment illustrated, this is accomplished by means of the worm 158 which "floats" on the shaft 160. That is, as described in connection with the worm drive for indexing the turret assembly 26, compression springs are placed on the shaft 160 on each side of the worm 158, so that when the magazine is accurately positioned at a stopping point, the worm may move slightly axially along its shaft 160. The shaft 160 is of course journaled in suitable bearings 162 and 164 carried by the worm housing 166. As seen in FIG. 13, the shaft 160 may conveniently be driven directly by the hydraulic motor 168.

The worm 158 is in meshing engagement with, and serves to drive the worm wheel 170. The worm wheel 170, is in turn secured to the axle 172 of the magazine 31 and serves to index the tool compartments described hereinafter to the tool change position in response to appropriate signals.

Figures 15, 16, 17:
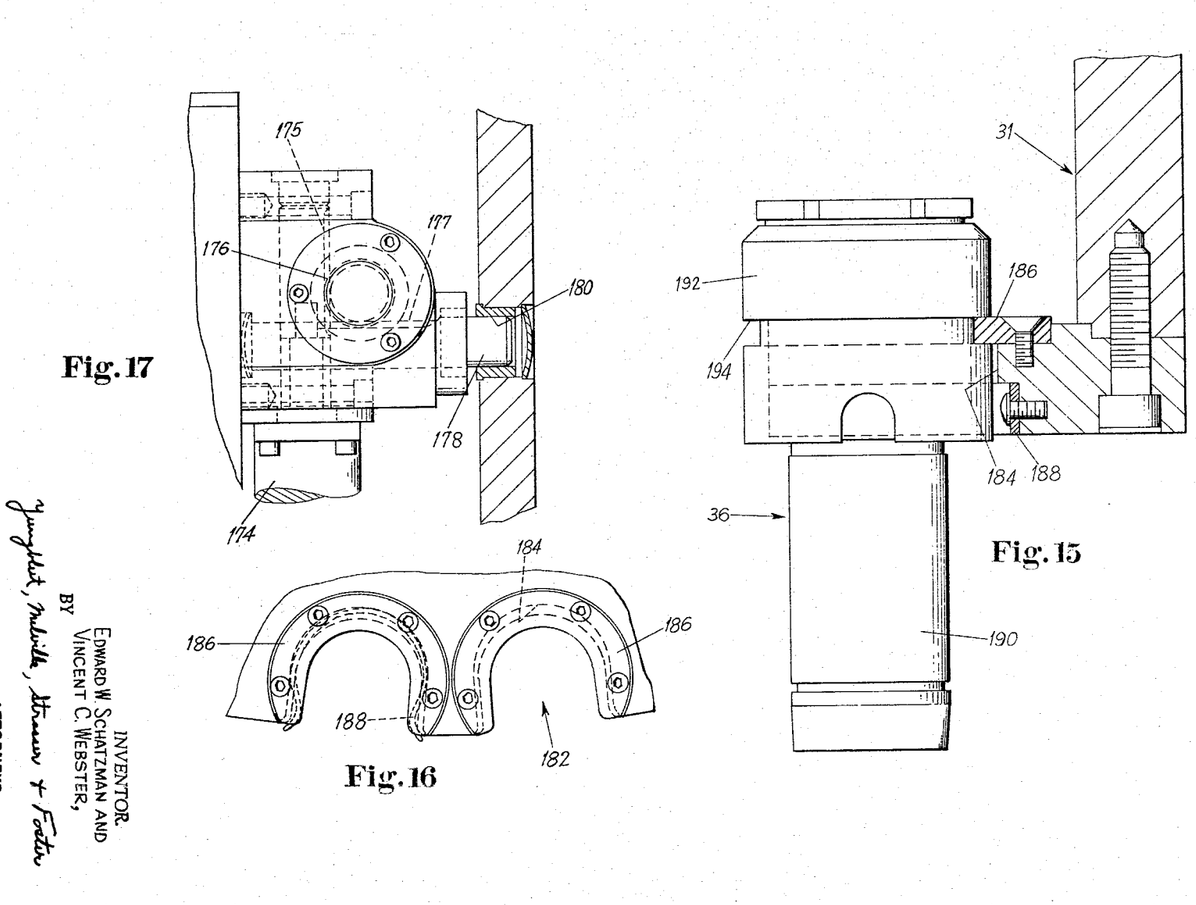
FIGURE 15 is a cross-sectional view on a greatly enlarged scale showing a tool holder engaged in the tool magazine.
FIGURE 16 is a top plan view showing two tool compartments of the tool magazine.
FIGURE 17 is a cross-sectional view showing the shot bolt mechanism for locking the tool magazine in the correct position.

Accurately indexed positions of the magazine 31 are achieved by means of the shot bolt assembly indicated in dotted lines in FIG. 13, and shown in more detail in FIG. 17. A small hydraulic cylinder 174 is utilized to drive a rack 175 which serves to drive a pinion gear 176. This pinion 176 is in meshing engagement with the rack 177 on the shot bolt 178. The shot bolt 178 in response to the hydraulic cylinder 174, is received in the apertures 180 of the magazine 31. By virtue of the floating worm drive discussed briefly above and the shot bolt mechanism, accurate indexing of the magazine 31 can effectively be achieved.

The tool magazine 31 is preferably provided with a large number of tool compartments indicated generally at 182. Referring to FIGS. 15 and 16, each tool compartment includes a recess 184 formed along the edges of the magazine 31, and a hardened steel insert 186 which forms a peripheral tool engaging lug associated with each recess 184. Each compartment 182 also includes a strip spring 188 which serves to hold a tool or tool holder in the compartment.

In the preferred form of the invention, each individual tool will be provided with a tool holder or collar indicated generally at 36, including a shank portion 190 and an enlarged collar portion 192 having an accurately formed annular groove 194. As will be apparent from examining the drawings, the tool holder, collar and groove 194 are so formed that the top portion 192 is nicely received within the recess 184, while the tool engaging lug 186 is received in the groove 194, the spring 188 releasably engaging the collar portion 192. It will therefore be apparent that the coaction of the above elements constrain the tool and tool holders against vertical movement in the path of reciprocation of the turret assembly, while permitting a tool holder to be released and/or engaged by the magazine upon its horizontal sliding movement.

It is to be understood that other elements, such as mechanical gripping fingers can be employed in the tool magazine, so long as the general functions set out above are accomplished.

It may be pointed out at this time that there are certain control problems encountered in indexing the magazine 31 to bring a desired tool or tool compartment to the tool change position. For example, immediately after a given spindle has been reloaded, there will be two empty tool compartments in the magazine. A skilled worker in the art will of course realize that it would be possible either to rotate the magazine 31 before unloading the next spindle, so that each tool is successively returned to the compartment from which it is removed, or, while somewhat more complex, it is possible to return the tool from the other spindle to the compartment presently in the tool change position, and from which a tool has just been removed.

Similarly, the magazine 31 may be designed to rotate constantly in one direction, or to rotate in either direction, in which case the controls may be arranged so that the magazine in every case will turn the shortest distance to bring the next proper tool to the tool change position. For various reasons, this latter arrangement has been adopted in the exemplary embodiment shown, wherein a roller 196 rides on the two level cam track 198. The roller 196 actuates the switch 200, and serves through appropriate electrical controls, to indicate the rotation of the magazine 31. One satisfactory switch arrangement includes utilization of the 16 position rotary switch 202, which rotates with the gear 204, which is in turn driven by the gear 206 secured to the magazine 31. It should be noted that a 2 to 1 ratio exists between the gears 204 and 206, so that the switch 202 makes two complete revolutions to one of the magazine 31.

It is believed that the foregoing constitutes a full and complete disclosure of the novel aspects of this invention. Many modifications and variations in the foregoing exemplary embodiment which are within the scope and spirit of this invention, will readily occur to the skilled worker in the art. For example, the tool change motions could be employed in conjunction with a horizontal or angular machine. Accordingly no limitation is intended except insofar as set forth in the following claims.

What is claimed as new, and what it is desired to secure by Letters Patent is:

1. In a machine tool, the improved tool change arrangement comprising:
    (a) a tool magazine slidable to a tool change position;
    (b) a plurality of tools removably secured in said magazine;
    (c) a rotatable turret movable in opposed working and loading strokes;
    (d) a working spindle carried by said turret;
    (e) a chuck for said spindle, adapted to engage selectively one of said tools; and
    (f) means for moving said turret in said opposed working and loading strokes, alternate working strokes normally being effective to remove a tool from said chuck and to perform a working operation, alternate loading strokes normally being effective to bring said chuck into engagement with one of said tools, and to withdraw said one of said tools from a work piece.

2. The tool change arrangement claimed in claim 1 including means for selectively releasing one of said tools from said magazine.

3. The tool change arrangement claimed in claim 2 including means for re-securing a tool carried by said chuck in said tool magazine.

4. The tool change arrangement claimed in claim 3 wherein said means for selectively releasing one of said tools from said magazine, and for re-securing a tool carried by said chuck in said magazine, both comprise means for moving said magazine in a path substantially perpendicular to the working and return strokes of said turret, said last named means operating in timed relation to said working and return strokes, whereby a tool may be released from said magazine after alternate return strokes and resecured in said magazine prior to alternate working strokes.

5. The tool change arrangement claimed in claim 4 wherein said magazine includes a plurality of tool compartments, said tools being removably secured in said tool compartments, means associated with each tool compartment for restraining said tool against movement in the direction of said working and return strokes.

6. The tool change arrangement claimed in claim 5 wherein each said tool includes a collar having an annular groove, and wherein said means for restraining said tool against movement in the direction of said working and return strokes comprises a peripheral tool engaging lug associated with each said tool compartment, said lug being receivable in said groove.

7. In a machine tool, the improved tool change arrangement comprising:
    (a) a tool magazine slidable to a tool change position;
    (b) a plurality of tools removably secured in said magazine;
    (c) a turret movable in opposed working and return strokes;
    (d) a first working spindle carried by said turret;
    (e) a second working spindle carried by said turret and substantially diametrically opposed to said first spindle, whereby when one of said spindles is in an operating position, the other of said spindles is in a tool change position;
    (f) means for reversing the positions of said spindles;
    (g) a chuck carried by each said spindle, adapted to releasably engage one of said tools;
    (h) means for moving said turret in said opposed working and return strokes, each working stroke being normally effective to perform a working operation with a tool carried by one spindle and remove a tool carried by the other spindle, each return stroke being normally effective to withdraw a tool carried by one of said spindles from a workpiece and to bring said chuck carried by said other spindle into engagement with a tool in said magazine.

8. The tool change arrangement claimed in claim 7 including means for selectively releasing one of said tools from said magazine.

9. The tool change arrangement claimed in claim 8 including means for resecuring a tool carried by said chuck in said tool change position, in said magazine.

10. The tool change arrangement claimed in claim 9 wherein said means for selectively releasing one of said tools from said magazine and for resecuring a tool carried by said chuck in said tool change position, in said magazine, both comprise means for moving said magazine in a path substantially perpendicular to the working and return strokes of said turret, said last named means operating in timed relation to said working and return stroke whereby a tool may be released from said magazine after each return stroke, and resecured in said magazine prior to each return stroke.

11. The tool change arrangement claimed in claim 10 wherein said magazine includes a plurality of tool compartments, said tools being removably secured in said tool compartments, means associated with each tool compartment for constraining said tool against movement in the direction of said working and return strokes.

12. The tool change arrangement claimed in claim 11 wherein each said tool includes a collar having an annular groove, and wherein said means for restraining said tool against movement in the direction of said working and return strokes comprises a peripheral tool engaging lug associated with each said tool compartment, said lug being receivable in said groove.

13. In a machine tool, the improved tool change arrangement comprising:
   (a) a tool magazine rotatable about an axis and slidable in a path perpendicular to said axis from a retracted position to a tool change position;
   (b) means for rotating said magazine;
   (c) means for sliding said magazine between said retracted position and said tool change position;
   (d) a plurality of tools;
   (e) means releasably securing said tools in said magazine;
   (f) a reciprocable turret, said turret being rotatable about an axis perpendicular to its path of reciprocation;
   (g) means for reciprocating said turret;
   (h) means for rotating said turret;
   (i) at least one spindle carried by said turret, and a chuck for said spindle adapted to selectively engage one of said tools;
said means for rotating and sliding said magazine, and said means for reciprocating and for rotating said turret, all operating in timed relation, whereby a desired tool may be engaged by said chuck, removed from said magazine, used to perform a working operation, returned to said magazine, and disengaged from said chuck.

14. The tool change arrangement claimed in claim 13 including a second spindle carried by said turret and a chuck for said second spindle, said second spindle being substantially diametrically opposed to said first named spindle, whereby when one of said spindles is in an operating position, the other of said spindles is in a tool change position.

15. The tool change arrangement claimed in claim 14 wherein said magazine includes a plurality of tool compartments, said tools being removably secured in said tool compartments, means associated with each tool compartment for restraining said tool against movement in said path of reciprocation.

16. The tool change arrangement claimed in claim 15 wherein each said tool includes a collar having an annular groove, and wherein said means for restraining said tool against movement in said path of reciprocation comprises a peripheral tool engaging lug associated with each said tool compartment, said lug being receivable in said groove.

17. The tool change arrangement claimed in claim 16 including spring means associated with each said tool compartment and being effective to release a tool engaged by said spindle in said tool change position when said magazine is slid to its retracted position.

18. In a machine tool, the improved tool change arrangement comprising:
   (a) a turret reciprocable in opposed working and return strokes;
   (b) a pair of diametrically opposed spindles carried by said turret and oriented generally parallel to the path of reciprocation of said turret, one of said spindles being in an operating position, and the other of said spindles being in a tool change position;
   (c) means for reciprocating said turret;
   (d) means for reversing the positions of said spindles;
   (e) a chuck for each said spindle adapted to releasably engage a tool;
   (f) means slidable in a path perpendicular to the reciprocation of said turret for normally supplying a tool to said spindle in said tool change position during each return stroke;
   (g) means for normally removing a tool from said spindle in said tool change position during each working stroke.

References Cited by the Examiner
UNITED STATES PATENTS
3,186,266   6/1965   Coate _______________ 29—568

RICHARD H. EANES, JR., *Primary Examiner.*